May 10, 1960
A. BRÄM
2,936,129
MULTIPLE PURPOSE WINDING MACHINE
Filed Oct. 15, 1956
2 Sheets-Sheet 1
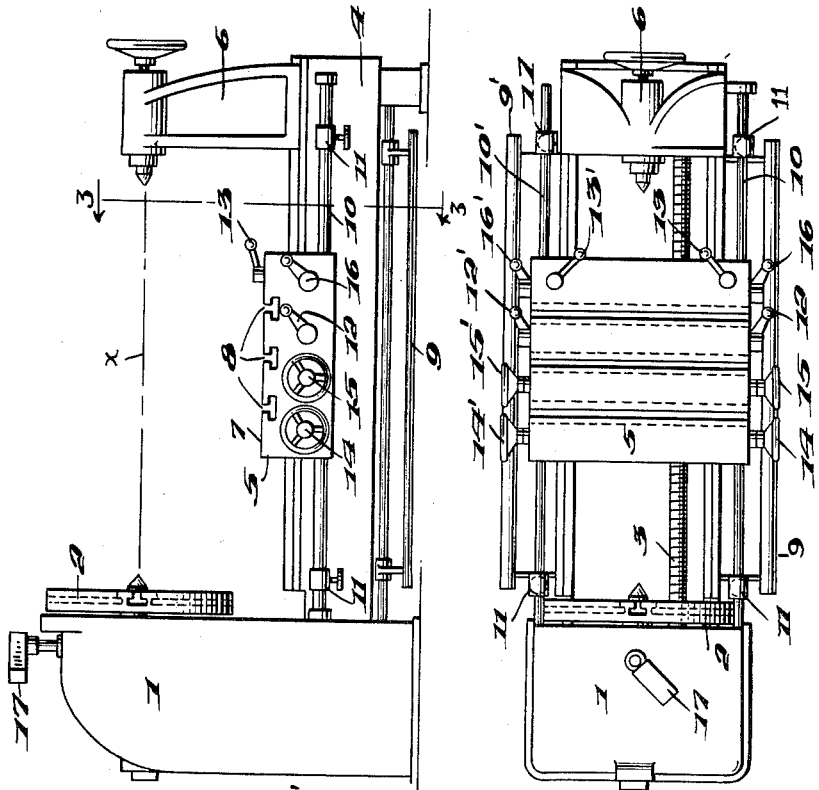
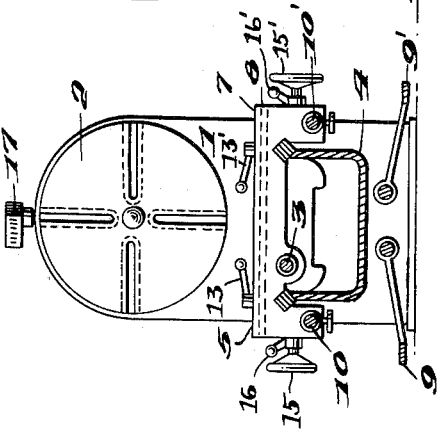
INVENTOR
Alfred Bräm
BY Pierce, Scheffler & Parker
ATTORNEYS May 10, 1960 A. BRÄM 2,936,129
MULTIPLE PURPOSE WINDING MACHINE
Filed Oct. 15, 1956 2 Sheets-Sheet 2
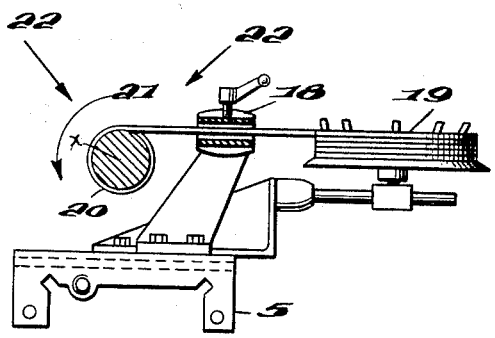
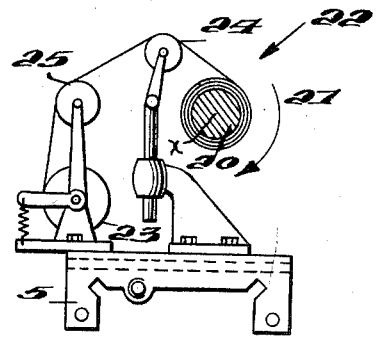
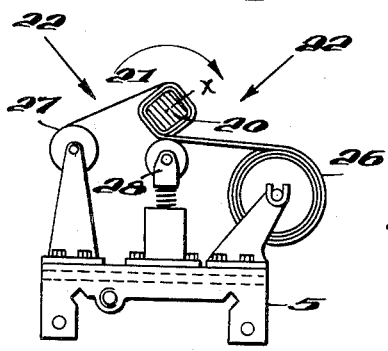
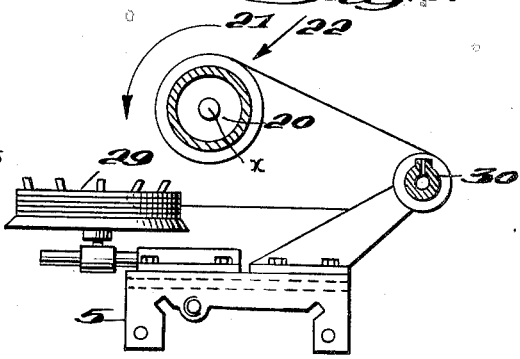
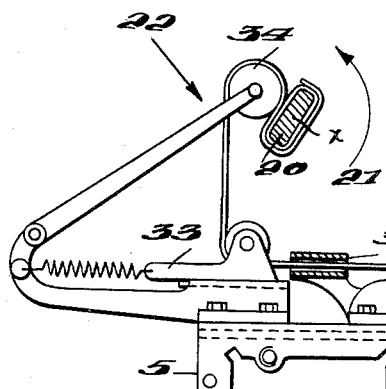
INVENTOR
Alfred Bräm
BY Pierce, Scheffler & Parker
ATTORNEYS United States Patent Office 2,936,129
Patented May 10, 1960

2,936,129
MULTIPLE PURPOSE WINDING MACHINE

Alfred Bräm, Schlieren, near Zurich, Switzerland, assignor to Micafil A.-G. Werke für Elektro-Isolation und Wickelereteinrichtungen, Zurich, Switzerland, a joint-stock company Application October 15, 1956, Serial No. 615,894

Claims priority, application Germany October 26, 1955

1 Claim. (Cl. 242—7)

This invention relates to winding or coiling machines and in particular to machines of this general type designed for use in the winding of coils that form components of electrical devices such as for example, dynamo-electric machines. Various types of so-called "single purpose" coiling machines are used in the manufacture of electrical coil components in accordance with the thickness of the wire to be wound, the type of coil, its shape and the transverse profile of the wire. For special purposes, these machines are equipped with devices for measuring the length of the wire, for adjustment of insulating interlayers between coil layers, for application of insulating material, for effecting pressure on the wire by means of rollers, for offsetting and cutting thick wires and for soldering and welding the wire, such equipment being, for the most part, located separately in front or behind the axis of the coil being wound. Almost in all cases, it is necessary to include a reeling-off device for supply and feed of the wire and an associated braking mechanism to prevent the wire from being reeled off too fast.

The disadvantage of the machines so far designed is that their wire feeding device is fixed in front of or behind the machine on a level with the coil axis where it is disposed in an obstructive manner for multiple purpose operations. This fixed installation determines mostly the sense of rotation of the shaft on which the coil being wound is mounted and the position of the operator. Another great disadvantage lies in the fact that the slide ways for the wire guide carriage cannot be built in a massive manner since such guide bed, on a level with the coil supporting shaft would make the machine entirely inaccessible on one side. Consequently, the wire guides must consist of comparatively thin grids or rod constructions which must, to a certain extent, permit manual feeding. Thus, there exists a great accident hazard. Due to this construction, the wire guide carriage cannot have the desired size and thickness to receive and locate the several already mentioned auxiliary devices and equipment. Consequently, these devices are mostly disposed beyond the machine which requires much space and time for service. For example, when a relatively long coil is to be wound with relatively thick wire, the reeling-off and braking device must be disposed at a distance of a few meters away from the machine in order to prevent the wire from being wound at too much of an acute angle to the coil axis.

To operate and observe the coiling or winding process, it is often necessary to allow the operator to stand either on the side of the wire intake or on the opposite side. Hitherto, this requirement was, indeed, partly met by orienting the devices unilaterally. However, as far as observations are concerned, it appears useless, since the actuation, correction of feed and manual contacts could be effected only from one preferred side. Taking these considerations into account, manufacturers have refrained from building coiling machines with wire feed devices for both senses of coil rotation.

In accordance with the present invention, all of the foregoing disadvantages are eliminated thus resulting in what can be called a "multiple purpose" coiling machine. The inventive concept resides in the adoption of a strong, horizontal bed which is disposed symmetrically with respect to the horizontal axis of the mounted coil being wound, and which is located below such coil axis. The tool carriage which can be of any desired size and strength is arranged to slide longitudinally along the bed. Since the space beneath the coil supporting shaft is practically unlimited, it is now possible to dispose on the carriage as many coiling aid auxiliary devices as its top clamping surface area will permit. The general view and accessibility from both sides of the machine is not impaired. A feed motion is imparted to the tool carriage with known means. By means of this arrangement, the face plate at the head end of machine to which the coil supporting shaft is coupled can be rotated in either direction. Thus the coil can be wound in either direction of rotation and the coiling operation can be effected from the front or from the rear side of the machine as required. All "service" units to be operated during the coiling process are now disposed in front of and are also duplicated behind the machine, with the exception of the centrally disposed winding turn counter and of those relative to the counter support. It is significant to induce the coil bench to run in both directions of rotation with the help of these devices accessible from both sides. With the facility of placing the coil winding implements on the tool carriage, it becomes possible to save much operating space. Moreover, one obtains exact results with little loss of time. Also, the accident hazard is considerably reduced. In order to enable an easy shifting of the heavy tool carriage on the bed even by hand it is contemplated that the carriage can be mounted on the bed by means of elastically supported rollers.

In the accompanying drawings which illustrate one embodiment of the invention:

Fig. 1 is a top plan view of the coiling machine;

Fig. 2 is a view of the machine in side elevation;

Fig. 3 is a vertical transverse section through the machine taken on line 3—3 of Fig. 2; and Figs. 4–8 show different set-ups on the machine for winding different types of coils and with different groups of auxiliary devices each suited to the particular type of coil being wound.

With reference now to the drawings and Figs. 1–3, it will be seen that the improved construction for the coiling machine in accordance with the present invention includes a head or driving stock 1 constructed in known manner and which includes a driven face plate 2 mounted thereon for rotation about a horizontal axis X, the said axis constituting the axis of rotation for the shaft (not shown) on which the coil body to be wound is mounted. This mounting shaft is adapted to be coupled to the face plate 2 so as to be rotated by the latter, and the face plate driving means included within the body of the head end 1 is preferably of the infinitely variable speed type.

In accordance with the invention of the horizontal carriage bed 4, extending from the head end structure 1, is positioned below the coil body rotating axis X and symmetrically with respect to such axis. A tool carriage 5 is mounted by means of ways on the bed 4 for movement longitudinally along the bed, and the feed of the carriage is effected by a horizontally extending lead screw spindle 3 which is driven in either direction by means of the infinitely variable speed type driving means located within the head end 1. The wrench lock and switching devices for effecting left and right motion of the feed are not shown. The tail end or stock 6 serves as a support for the opposite end of the coil mounting shaft. The clamping area 7 or the top face of the carriage 5 is provided with a plurality of transverse, parallel spaced, undercut grooves 8 which serve to permit attachment of the various kinds of coil winding implements and auxiliary devices which may be required for the winding of a particular type of coil. It is also possible to provide additional clamping areas disposed vertically with respect to the horizontal area 7.

In order to permit operation of the machine from either side, a foot actuated treadle 9 extends longitudinally along the front side of the machine adjacent the floor and a like treadle 9' is located along the rear side of the machine. Treadle 9 serves to engage or disengage a clutch (not shown) inside the gear box of the machine for setting the machine in or out of operation. A longitudinally slidable feed reversing gearshift bar 10 extends longitudinally along the front side of the machine at the level of carriage 5 and is adapted to be actuated by hand in one direction or the other in order to drive the feed screw 3 and carriage 5 in one direction or the other. Adjustable dogs 11 mounted on the opposite end positions of the feed reversing bar 10 serve to limit the stroke of the carriage 5 in either direction of movement. When carriage 5 strikes either of the dogs 11, it causes the shift bar 10 to be actuated thus reversing the direction of movement of the carriage 5. In order that the feed screw 3 reversing mechanism may be operated from the opposite side, a similar gearshift bar 10' extends longitudinally along the rear side of the machine. A lever 12 for disengaging the wrench lock of the feed screw 3 is disposed at the front side of and on the carriage 5, and a similar lever 12' is located at the rear side of carriage 5 to permit operation from that side also. Levers 13 and 13' for clamping the carriage 5 to the bed 4 are likewise located at the top of the carriage 5 near the front and rear sides respectively to permit operation from both sides of the machine. For adjusting the feed velocity from either side of the machine, handwheels, 14 and 14' are provided at the front and rear sides of carriage 5, and in a similar manner, handwheels 15, 15' located at the front and rear sides of carriage 5 serve to change the winding speed. Switching levers 16, 16' also located respectively at the front and rear sides of the carriage 5 serve to effect a reversal in the direction of rotation simultaneously with a reversal in the direction of the feed. The switching members 15, 15' and 16, 16', which are less frequently actuated, may optionally be located on the front and rear sides respectively of the head end 1. A device for counting the number of turns of wire wound on the coil body is shown at 17 on the head end, above the coil mounting axis X.

Figs. 4 to 8 depict different and typical set-ups on the winding machine for winding different types of coils. In all of these views, the coil body being wound is designated by numeral 20, its direction of rotation is indicated by arrow 21 and the side of the machine (front or rear) at which the coil winding operation is supervised, which can be called the "service side," is indicated by the arrow or arrows 22.

A set-up for winding relatively thick wire on a round coil body is shown in Fig. 4. A brake for the wire being fed to the coil body 20 rotatable about its axis X is shown at 18. The wire storage reel from which the wire is fed is shown at 19 and both of these devices are of course mounted upon the carriage 5. According to the particular circumstances, the "service side" must be selected according to the direction arrows 22.

In Fig. 5 there is shown an arrangement for winding relatively fine wire onto a round rotating coil body 20. Here the storage reel for the wire is indicated at 23, a wire guide roller is indicated at 24 and a wire tension compensating device is indicated at 25. All of these components (23, 24 and 25) are mounted in an upstanding manner on carriage 5 and the guide roller 24 and tension compensating device 25 are located to the same side of the rotational axis X of the coil body 20. Consequently, the "service side" 22 is located to the other side of the rotational axis X.

In Fig. 6 the set-up is for winding a rectangularly configured coil body with wire and also wtih insulation. The storage and feed-off reel for wire is indicated at 27 and is located to one side of the coil body rotational axis X. The storage and feed-off reel for the insulation tape, indicated at 26 is located to the opposite side of rotational axis X. The presser roller 28 by which the wound on wire and insulation layers are maintained under pressure is located below and in the vertical plane containing the rotational axis X. As with the other embodiments, the reels 26, 27 and pressure roller 28 upstand upon the carriage 5. Control and service are performed at both sides of the machine as indicated by arrows 22, as circumstances require.

In Fig. 7, the machine is set up for applying a wire band to a motor rotor. Here the wire storage and feed-off reel 29 are placed to one side of the rotational axis X and the braking device 30 is located to the opposite side of such axis. As before, the reel 29 and brake 30 are mounted on carriage 5. Soldering work requires that the machine be serviced according to the directional arrow 22.

Fig. 8 illustrates a machine set-up for winding wire having a rectangular configuration in cross section onto a body also of rectangular configuration. Bending of the wire is effected by means of a guide roller 34 positioned under the wire line for the purpose of satisfactory application of the wire on the long side of its rectangular shape. The wire storage and feed-off reel 31, wire brake 32, and tension compensating device 33 are mounted upon carriage 5. The "service side" of the machine indicated by arrow 22 is at the side opposite reel 31.

The above described set-ups are merely examples of the many different ways in which the machine may be set up for performing different types of coil winding operations and with good observation and supervision without impairing the accessibility, provide that the winding tool and implement supporting carriage 5 is disposed horizontally below the rotational axis X of the coil body 20 in accordance with the present invention. Also, the above described examples in Figs. 4–8 show how the position of the "service side" changes suitably in relation to the direction of rotation according to the winding program and thus both senses of rotation of the coil axis X are required.

The position of the operator servicing the machine and thus even the direction of rotation of the machine depend very often upon the spatial conditions around the machine when e.g. the machine is disposed parallely or vertically to a near wall where several machines are disposed slantly side-by-side or in the free space. Thus a suitable selection is feasible.

I claim:

In a coiling machine adapted to serve multiple purposes for the winding of wire of different thickness in the range from thin to thick, the combination comprising a head end and a tail end establishing a horizontal axis of rotation for a coil body to be wound, a horizontal bed extending between said head and tail ends, said bed being located below said axis of rotation for the coil body and symmetrically to each side of said axis of rotation, a single reversible tool carriage mounted on said bed below said axis of rotation for movement along the bed in either direction, said tool carriage extending laterally to each side of said axis of rotation, means on said carraige for removably mounting coil winding implements and auxiliary devices, said head end containing means for driving said coil body around said axis of rotation in both directions of rotation and for feeding said tool carriage along said bed in either direction, and two sets of service members for controlling the operating functions of said coiling machine, said sets of service members being located respectively at the front and rear sides of said machine to permit operation thereof from either side, and at least some of said service members of each set being located respectively on said carriage at the front and rear sides thereof.

References Cited in the file of this patent

UNITED STATES PATENTS

| | | |
|---|---|---|
| 2,050,746 | Bickel | Aug. 11, 1936 |
| 2,585,217 | Bickel et al. | Feb. 12, 1952 |
| 2,676,761 | Wirth | Apr. 27, 1954 |
| 2,748,831 | Nash | June 5, 1956 |
| 2,762,269 | Gallimore | Sept. 11, 1956 |

FOREIGN PATENTS

| | | |
|---|---|---|
| 355,677 | Germany | June 30, 1922 |